May 2, 1950
C. G. JOCKISCH
2,505,859
FRUIT JAR TOP STRAIGHTENER AND TIGHTENER
Filed Sept. 21, 1945
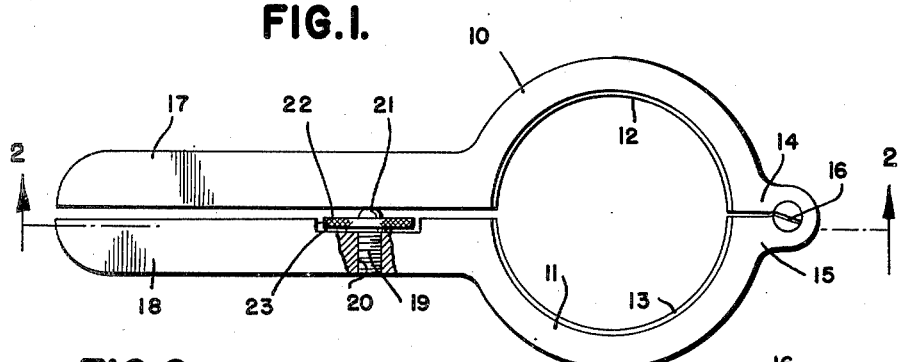
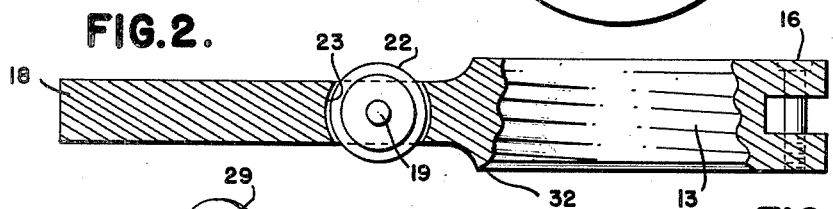
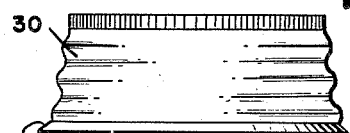
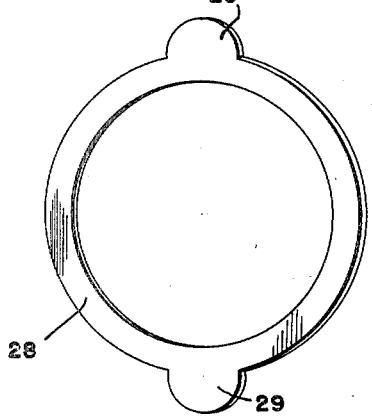
INVENTOR.
CHARLIE G. JOCKISCH
BY
Mawhinney Mawhinney
ATTORNEYS Patented May 2, 1950

2,505,859

UNITED STATES PATENT OFFICE 2,505,859

FRUIT JAR TOP STRAIGHTENER AND TIGHTENER

Charlie G. Jockisch, Mobile, Ala.

Application September 21, 1945, Serial No. 617,789

1 Claim. (Cl. 81—15.1)

The present invention relates to improvements in fruit jar top straightener and tightener and has for an object to provide a type of wrench for tightening or removing the screw tops or covers of fruit jars such as the well known Mason jar.

In the transportation, use and storage of these fruit jar tops, the threads become distorted and the cap or top which is cup-shaped becomes dislocated out of the true cylindrical condition and such top becomes displaced locally in an axial direction; all of which causes misalignment of the cap upon the jar so that its main function of sealing the contents of the jar is jeopardized; and it is therefore an important object of the present invention to incorporate a die in the straightener which conforms to the correct configuration of the external cylindrical part of the jar cap and which will have a squeezing effect on the jar top in the act of applying the same to the threaded neck of the jar in such a manner as to restore the true and original contours of the cap so that the same may properly cooperate with the jar neck and with the sealing gasket ordinarily employed in connection with such jars and their caps.

A further important object of the invention is to produce a tool constructed and arranged and functioning to straighten the crimped and uneven edges of the screw cap at the point where the cap comes up against the flexible gasket to the end that uniformity of pressure of such cap edges against the gasket is insured to perfect sealing.

A further object of the invention is to provide a simple form of die straightener hinged in two members for ready application to and removal from the jar cap in which handles are provided for the two members for convenience in gripping the die members about the jar cap.

A still further object of the invention is to provide a two-piece die straightener of the character indicated in which an adjustable gauge is associated with the handle members to predetermine the degree of angular closing of the die members about the pivot point upon the jar cap.

With the foregoing and other objects in view, the invention will be more fully described hereinafter, and will be more particularly pointed out in the claim appended hereto.

In the drawings, wherein like symbols refer to like or corresponding parts through the several views, Figure 1 is a top plan view of an improved fruit jar top straightener and tightener as constructed in accordance with the present invention, Figure 2 is a longitudinal section taken through one handle and its companion die member, Figure 3 is a side elevation of a screw jar cap, Figure 4 is an edge view of a form of gasket employed;

Figure 5 is a fragmentary side elevation of a fruit jar, and

Figure 6 is a plan view of the gasket.

Referring more particularly to the drawings, 10 and 11 designate semi-circular die members having threads 12 and 13 therein and lugs 14 and 15 projecting radially from adjacent free ends of the members 10 and 11, such lugs being interfitting or overlapping and perforated to receive the pivot pin 16 upon which the die members 10 and 11 may angularly swing relatively to one another in the opening and closing movements of the die.

Diametrically opposite the lugs 14 and 15 are elongated handles 17 and 18 projecting radially from the opposite ends of the semi-circular die members 10 and 11 by which these members 10 and 11 may be opened and closed; and when closed the handles 17 and 18 lie in approximate parallelism, the two handles 17 and 18 being of combined thickness susceptible of being grasped firmly in one hand whereby to hold the two members 10 and 11 tightly clamped about a jar cap.

One handle 18 carries a screw 19 adjustable in a threaded bore 20 made transversely through the handle member 18 in an axial line intersecting the adjacent face of the companion handle 17. Such screw 19 is made with a bald rounded gauge head 21 and may be rotated by a knurled wheel 22 made integral with or fixed to such screw 19. The knurled wheel 22 is accommodated partially in a recess 23.

As appears in Figure 1 this recess 23 is let into the inner edge of the handle 18 and opens through such edge. The depth of the recess 23 is approximately that of the thickness of the knurled wheel 22. However, the diameter of the wheel 22 exceeds that of the height or thickness of the handle 18 in a direction at right angles to the axis of the bore 20 which enables segments of the wheels 22 to project above and below the top and bottom planes of the handle 18; which condition is shown to best advantage in Figure 2, whereby the knurled peripheral edge of the wheel 22 is exposed to the thumb and fingers of the operator for convenience in rotation.

Referring more particularly to Figures 3 to 6 inclusive, a glass or other preserving jar 24 is shown with a neck 25 having the threads 26 and the base flange 27. A ring gasket or washer 28 is adapted to fit over the neck 25 and to seat upon the base flange 27. Such gasket or washer may have diametrically opposed tabs 29 to be grasped by the fingers in the act of forceably pulling the rubber or other flexible or resilient gasket 28 down over the threads 26 and into engagement with the base flange 27.

A cup-shaped screw jar cap or top 30 is adapted to thread upon the neck threads 26 and has a lower edge or out-turned flange 31 positioned to grip and compress the gasket 28 tightly against the base flange 27 when the jar top 30 is screwed home.

In the use of the device, the jar caps 30, which are made of a light gauge sheet metal often become distorted and locally dislocated, particularly in winter storage and the invention seeks to restore these jar tops while in the act of screwing the same upon the jars. To this end the threads 12 and 13 of the die members 10 and 11 are made to conform to the convolute configuration of the jar cap 30. These die members 10 and 11 may be opened out by means of the handles 17 and the device fitted over and lowered upon the jar cap; subsequently such device is closed by bringing the handles 17 and 18 together with the threads 12 and 13 clamping about the threaded cylindrical wall of the jar cap 30. It is desired to avoid excessive radial pressure of the die upon the jar cap to avoid marring or distorting the threads, and to prevent excessive gripping of the glass neck 25.

For this purpose the screw 19 may be run in and out of the threaded bore 20 by rotation of the knurled wheel 22. Such movement will cause the gauge head 21 to approach or recede from the adjacent edge of the companion handle 17. When this handle 17 strikes the gauge head 21 it limits the closing movement of the die members 10 and 11 in their angular movements about the common pivot 16.

Therefore the two handle members 17, 18 may together be gripped and squeezed very tightly in one hand without intense radial pressure devolving upon the cylindrical wall of the jar cap 30. The degree of inward radial pressure may be adjusted very nicely and quickly by rotation of the knurled wheel 22 and the thumb and fingers of the hand squeezing the two handles 17, 18 is favorably positioned for engaging and rotating the exposed segments of this wheel.

It will be noted that a sliding movement of the hand along the elongated handle 17 and 18 is the movement which accomplishes the rotation of the wheel and that this is a natural and easy movement for the hand in its engaging position upon the handle 17, 18. The gauge also permits one hand to squeeze the handle 17, 18 tightly together without having to exercise any discretion in the amount of applied pressure but at the same time the gauge takes care in an extremely nice regulation of the amount of that squeezing pressure which may be transmitted to the die members and to the jar cap.

From Figure 2 it will be seen that the lower edge of the die opening leading to the threads 12 and 13 is formed into a downwardly flaring mouth 32 complementary to the upper surface of the base flange 27. This flaring mouth 32 is designed to come up against the flange 31 of the cap 30 straightening that flange 31 and causing it to make a tight joint by pressing the gasket 28 uniformly all around down upon the base flange 27. This is accomplished at the same time that the threads 12 and 13 are smoothing out the threaded walls of the cap 30.

After this smoothing operation, the die may be unscrewed about half a turn. The wheel 22 is then rotated about one turn in a direction to withdraw somewhat the gauge head 21 from the companion member 17 which will permit the closer squeezing of the two handles 17 and 18 together. This permits the die to tighten on the lid or cap 30 so that the latter can be screwed on tight, after which the die is removed, the wheel 22 rotated in a direction to pry the handle sections 17 and 18 open and this easily permits the die to disengage itself from the jar cap.

In other words, in the operation of tightening the lid, the die carrying the cap 30 is screwed on to the neck of the jar for about ¾ of its movement, then the gauge 21 is withdrawn to release the handle members 17 to permit a closer clamping of the jar cap in the die during the remainder of the rotary movement, after which the die is removed without affecting the cap by screwing out the gauge 21.

It is obvious that various changes and modifications may be made in the details of construction and design of the above specifically described embodiment of this invention without departing from the spirit thereof, such changes and modifications being restricted only by the scope of the following claim:

What is claimed is:

For use with a jar having an externally screw threaded filling neck with a base flange, a washer adapted to seat on the flange, and a screw cap adapted to rotatably seat upon the threaded filling neck and having a base flange for compressing the washer against the neck flange, a tool comprising two substantially semi-circular rigid die members having rigid threads upon their inner faces in continuation of one another when the sections are fitted substantially together and being the counterpart of the threads upon the jar caps, radial lugs on adjacent ends of the two sections having overlapping perforated parts at their outer ends, a pivot inserted through the outer perforated parts of the lugs to hingedly connect the rigid sections at a point remote from the circle of their threaded portions, handles outstanding from the other end portions of the sections and adapted to come approximately together in parallellism, a flaring mouth at the base of the screw threaded portions of the sections adapted to encounter the base flange of the screw cap, one of said handles having a recess opening on its inner face and through the upper and lower surfaces of the handle, said recessed handle having a threaded opening therein with its axis substantially centrally of the recess and substantially centrally of the distance between the upper and lower surfaces of the handle, said axis being substantially horizontal, a screw having a threaded outer end portion fitting in said threaded opening and rotatable and axially movable therein, said screw also having an intermediate portion located in said recess opening and an inner end portion projecting beyond the inner face of the handle having said recess opening, said inner end having a rounded head positioned to engage against the inner surface of the opposite handle, and a knurled-edged wheel fixed to said screw between said threaded opening and said rounded head and lying in said recess with knurled segments thereof projecting above and below said upper and lower surfaces of the recessed handle.

CHARLIE G. JOCKISCH.

REFERENCES CITED

The following references are of record in the file of this patent:

UNITED STATES PATENTS

| Number | Name | Date |
| --- | --- | --- |
| 95,102 | French | Sept. 21, 1869 |
| 893,838 | Fischer | July 21, 1908 |
| 1,319,007 | Kind | Oct. 14, 1919 |
| 1,407,710 | Tillman | Feb. 28, 1922 |
| 1,458,292 | Hart | June 12, 1923 |
| 2,029,974 | Whitaker | Feb. 4, 1936 |
| 2,398,209 | Clemens | Apr. 9, 1946 |